United States Patent
Jensen et al.

(10) Patent No.: US 6,447,560 B2
(45) Date of Patent: *Sep. 10, 2002

(54) METHOD FOR FORMING A SUPERABRASIVE POLYCRYSTALLINE CUTTING TOOL WITH AN INTEGRAL CHIPBREAKER FEATURE

(75) Inventors: Kenneth M. Jensen, Springville; David Miess, Highland; Bill J. Pope, Provo, all of UT (US)

(73) Assignee: US Synthetic Corporation, Ovem, UT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/253,581

(22) Filed: Feb. 19, 1999

(51) Int. Cl.⁷ .............................. B24D 18/00; B23P 15/28
(52) U.S. Cl. ............................. 51/293; 51/297; 451/540; 407/6; 407/114; 407/115
(58) Field of Search ..................... 51/293, 297, 307, 51/309; 407/6, 114, 115, 116; 451/540

(56) References Cited

U.S. PATENT DOCUMENTS

| | | | | |
|---|---|---|---|---|
| 3,745,623 A | * | 7/1973 | Wentorf, Jr. et al. ......... | 51/309 |
| 4,957,396 A | * | 9/1990 | Niebauer ..................... | 407/114 |
| 4,984,642 A | * | 1/1991 | Renard et al. ............... | 407/118 |
| 5,026,960 A | * | 6/1991 | Slutz et al. .................. | 407/115 |
| 5,569,000 A | * | 10/1996 | Littecke et al. .............. | 407/114 |
| 6,010,283 A | * | 1/2000 | Henrich et al. .............. | 407/119 |

* cited by examiner

Primary Examiner—Michael Marcheschi
(74) Attorney, Agent, or Firm—Lloyd W. Sadler

(57) ABSTRACT

A method or process for making polycrystalline diamond or polycrystalline CBN cutting tools (Superabrasives), which have integral chip-breaking features is disclosed. This method involves pressing a die or other like rigid component against either the outer can cover or the diamond or CBN region directly. This invention provides economical manufacture of diamond chip-breaker tools, while avoiding unnecessary EDM EDG, grinding, or laser processes. This process forms the chip-breaker on the upper surface of the diamond region, during or prior to sintering. This invention permits a wide variety of chip-breaker or other diamond surface features, while minimizing cost and processing steps. Disclosed embodiments include: pressing through the can assembly; pressing within the assembly by introducing a rigid component in the can; and pressing two cans together with an intervening rigid component imposing the desired diamond surface features.

8 Claims, 4 Drawing Sheets

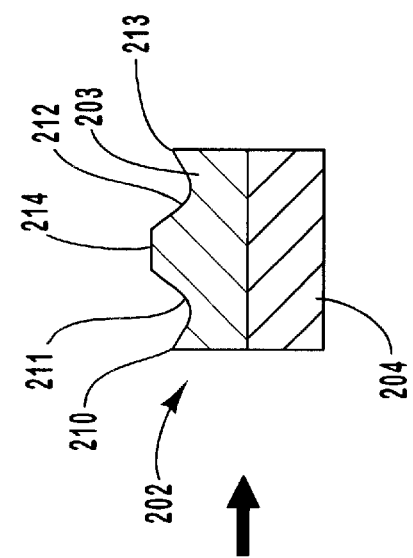
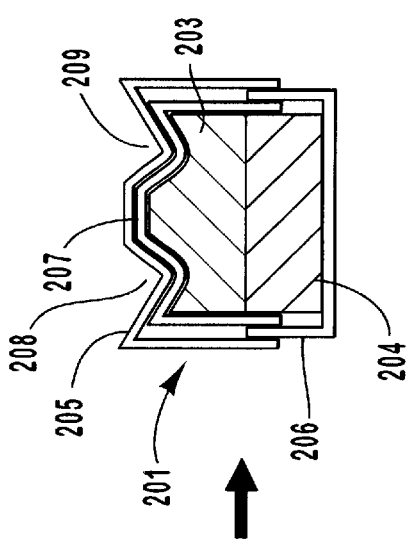
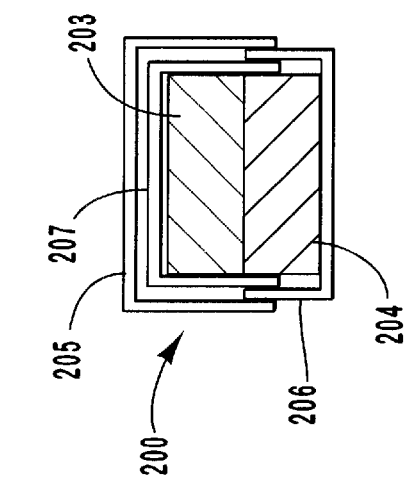
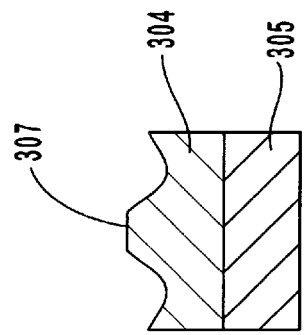
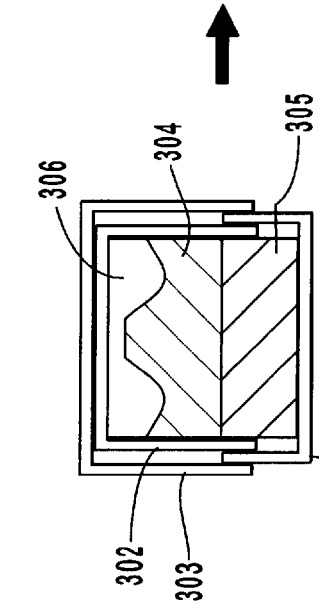

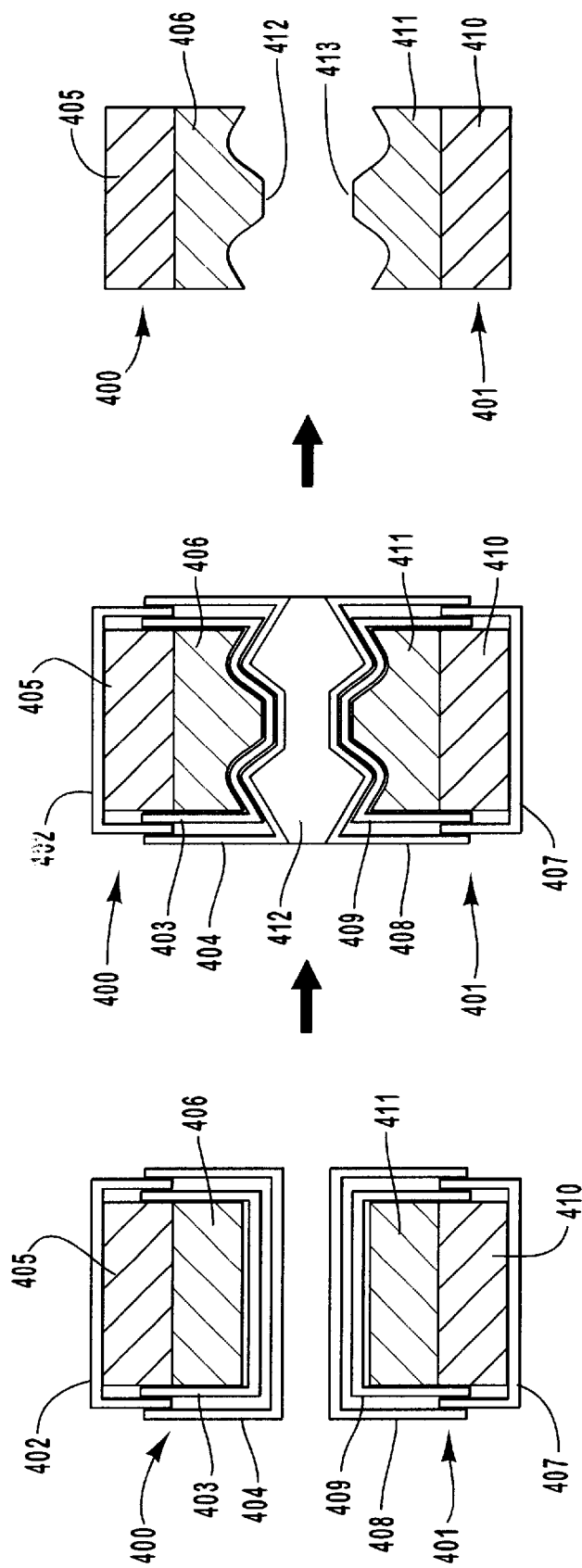

METHOD FOR FORMING A SUPERABRASIVE POLYCRYSTALLINE CUTTING TOOL WITH AN INTEGRAL CHIPBREAKER FEATURE

BACKGROUND OF THE INVENTION

1. Field of the Invention

This invention relates to devices for machining of materials. More specifically, this invention relates to polycrystalline diamond (PCD) and polycrystalline cubic boron nitride (PCBN) cutting tools, which for the purposes of this patent disclosure will both be commonly referred to as "Superabrasives", and which are intended to be installed as the cutting element in drilling, milling, or turning operations on lathes, mills, or other metalworking, woodworking, machining, or shaping industrial equipment. Still more specifically, this invention relates to polycrystalline diamond or polycrystalline cubic boron nitride cutting tools, which have an integral chip-breaking feature.

2. Description of Related Art

Polycrystalline diamond and cubic boron nitride CBN cutting tools are used in industrial machinery, such as lathes, milling machines and other drilling and reaming applications, as well as general shaping of metals, wood, plastics, composites or other machinable materials. A number of different configurations, materials and geometries are used in polycrystalline diamond and PCBN cutting tool manufacture. Typically, diamond and CBN cutting tools that have chip-breaking features have the chip breaker feature added after the sintering processing step. Often the chip breaker is included in the cutting tool by use of an electric discharge grinding or machining which is a high temperature, cobalt depletive process. Laser etching processes or grinding steps of the final geometry may also be used. Such process steps can induce structural problems in the tool due to excessive heat and cobalt binder depletion as well as increasing the manufacturing time and cost because of the extra processing steps. These problems have restricted the production of PCD or PCBN chip-breaker tools by these known methods.

By way of introduction, a polycrystalline diamond cutter (PCD) or PCBN, or superabrasive polycrystalline cutting tool, is typically fabricated by placing a cemented tungsten carbide substrate into a refractory metal container (can) with a layer of diamond or cubic boron nitride crystal powder placed into the can adjacent to one face of the substrate. Additional cans are used to completely enclose the diamond powder and the carbide substrate. A number of such can assemblies are loaded into a high-pressure cell made from a low thermal conductivity extrudable material such as pyrophyllite or talc. The loaded high-pressure cell is then placed in a high-pressure press. The entire assembly is compressed under high pressure and temperature conditions. This causes the metal binder from the cemented carbide substrate to sweep from the substrate face through the diamond or CBN grains and to act as a reactive phase to promote the sintering of the diamond or CBN grains. The sintering of the diamond or CBN grains causes the formation of a polycrystalline diamond or CBN structure. As a result the diamond or CBN grains become mutually bonded to form a diamond or CBN mass over the substrate face. The metal binder may remain in the diamond or CBN layer within the pores of the polycrystalline structure or, alternatively, it may be removed via acid leaching and optionally replaced by another material forming so-called thermally Superabrasive tools. Variations of this general process exist and are described in the related art. This detail is provided so the reader may become familiar with the concept of sintering a diamond or CBN layer onto a substrate to form a Superabrasive cutting tool. For more information concerning this process, the reader is directed to U.S. Pat. No. 3,745,623, issued to Wentorf Jr. et al., on Jul. 7, 1973.

For general background material, the reader is directed to the following United States patents, each of which is hereby incorporated by reference in its entirety for the material contained therein.

U.S. Pat. No. 3,745,623 describes diamond tools and superpressure processes for the preparation thereof, where the diamond content is present either in form of a mass comprising diamond crystals bonded to each other or of a thin skin of diamond crystals bonded to each other.

U.S. Pat. No. 3,767,371 describes abrasive bodies comprising combinations of cubic boron nitride crystals and sintered carbide.

U.S. Pat. No. 4,403,015 describes a compound sintered compact for use in a cutting tool having particularly high properties in respect of bonded strength, hardness, wear resistance, plastic deformability and rigidity by bonding a diamond or cubic boron nitride containing a hard layer to a cemented carbide substrate with interposition of an intermediate bonding layer.

U.S. Pat. No. 4,387,287 describes a method for shaping polycrystalline, synthetic diamond and, in particular, to the production of profiled parts like tools.

U.S. Pat. No. 4,854,784 describes an improved metal cutting insert, which incorporates a polycrystalline diamond or a polycrystalline cubic boron nitride material therein as a cutting edge material.

U.S. Pat. No. 5,011,514 describes superabrasive cutting elements, backed compacts and methods for their manufacture, wherein metal coated superabrasive particles are cemented under high pressure/high temperature conditions.

U.S. Pat. No. 5,026,960 describes an oversize compact blank having a surface and edges that establish it as oversized. A chip breaker pattern is formed on the compact blank surface.

U.S. Pat. No. 5,193,948 describes an insert having a cutting segment of a polycrystalline diamond or cubic boron wafered between two layers of a hard metal carbide is bonded into a pocket in a standard insert and machined to form a chip breaker having a clearance surface and expose the cutting edge of polycrystalline material integral with the cutting segment.

U.S. Pat. No. 5,405,711 describes an indexable cutting insert having a polycrystalline cutting edge along the entire periphery of the insert.

U.S. Pat. No. 5,447,208 describes a superhard cutting element having a polished, low friction, substantially planar cutting face with a surface finish roughness of 10 micro inches and preferably 0.5 micro inches or less.

U.S. Pat. No. 5,449,048 describes a drag bit having a plurality of blades or ribs on its end face that has one or more pockets milled into the top surfaces of said blades using a ball-nosed end mill to create a plurality of pockets, each having a spherical or a semi-spherical first end and a second end having a semicircular configuration that intersects with the leading edge face of the rib.

U.S. Pat. No. 5,569,000 describes a cutting insert that is formed by making a body, which includes a chip face having an outer peripheral edge.

U.S. Pat. No. 5,653,300 describes a superhard cutting element having a polished, low friction substantially planar cutting face with a surface finish roughness of 10 micro inches or less and preferably 0.5 micro inches or less.

U.S. Pat. No. 5,704,735 describes a fly cutter wheel which has at least one projecting tooth at a distance from its rotation axis and a chip breaker forward of said tooth in its rotation direction.

U.S. Pat. No. 5,709,907 describes a method of producing a cutting tool, comprising a substrate which has a roughened surface that presents a surface roughness of between 10 micro inches and 125 micro inches.

U.S. Pat. No. 5,722,803 describes a coated cutting tool and a method of producing the same.

U.S. Pat. No. 5,771,972 describes a mill assembly and whipstock assembly.

SUMMARY OF THE INVENTION

In cutting tools, which are used to machine metals, composites, wood or other machinable materials, it is often desirable to provide a tool having a chip breaker feature. More particularly, it is desirable to provide a method for forming such a chip breaker tool feature by coining a desired geometry onto a polycrystalline diamond or PCBN surface prior to or during high temperature and high-pressure sintering.

Therefore, it is an object of this invention to provide a Superabrasive cutting tool with an integral chip breaker feature.

It is a further object of this invention to provide a method of manufacturing a Superabrasive cutting tool with a chip breaker feature by coining the desired chip-breaker geometry onto the diamond or CBN surface prior to high temperature/high pressure pressing.

It is a further object of this invention to provide a method of manufacturing a Superabrasive cutting tool with a chip breaker feature by forming the chip breaker geometry in-situ during high temperature/high pressure sintering.

It is another object of this invention to provide a method of manufacturing a Superabrasive cutting tool with a chip-breaker feature by inclusion of a rigid or semi-rigid form against the diamond or CBN in the high temperature/high pressure cell during sintering.

It is a further object of this invention to provide a method of manufacturing a Superabrasive cutting tool with a chip breaker feature that avoids the application of heat, or the removal of cobalt by EDM or EDG or laser processes.

It is a further object of this invention to provide a method of manufacturing a Superabrasive cutting tool with a chip breaker feature that avoids the grinding of the final surface geometry.

These and other objectives, features and advantages of this invention, which will be readily apparent to those of ordinary skill in the art upon review of the following drawings, specification, and claims, are achieved by the invention as described in this application.

BRIEF DESCRIPTION OF THE DRAWINGS

FIGS. 2a, 2b and 2c depict section views of the preferred Superabrasive cutter with the chip-breaking tool being manufactured by the process of FIG. 1a.

FIGS. 3a and 3b depict section views of the preferred Superabrasive cutter with the chip-breaking tool being manufactured by the process of FIG. 1b.

FIGS. 4a, 4b and 4c depict section views of the preferred Superabrasive cutter with the chip-breaking tool being manufactured by the process of FIG. 1c.

Reference will now be made in detail to the present preferred embodiment of the invention, an example of which is illustrated in the accompanying drawings.

DETAILED DESCRIPTION OF THE INVENTION

This invention is intended for use in Superabrasive cutting tools. Typically, the diamond cutting tool is held in a lathe, mill or other machine. When the cutting tool or workpiece is rotated, the leading edge of Superabrasive cutting tool comes into contact with the workpiece. Certain applications are enhanced by the use of Superabrasive cutting tools with chip breaking features. A chip breaker is a generally non-planar surface feature of the Superabrasive cutting tool, which is adapted specifically to cause fractured portions of a workpiece to be broken up into short pieces or chips that can be easily removed. The ease of chip removal is also important to maximize machining efficiency as well as reducing the damage done to the cutting tool by the fractured portions of the workpiece. By preventing the formation of long continuous chips, chip breaker tools reduce the danger to machine operators, and permit improved coolant flow to the cutting edge, thereby producing longer tool life and improved workpiece finish. While chip breakers in general and even some chip breakers formed in association with polycrystalline diamond or PCBN structures have previously been suggested, this invention is directed to improved processes for the manufacture of Superabrasives with chip breaker features.

Figure 1A:
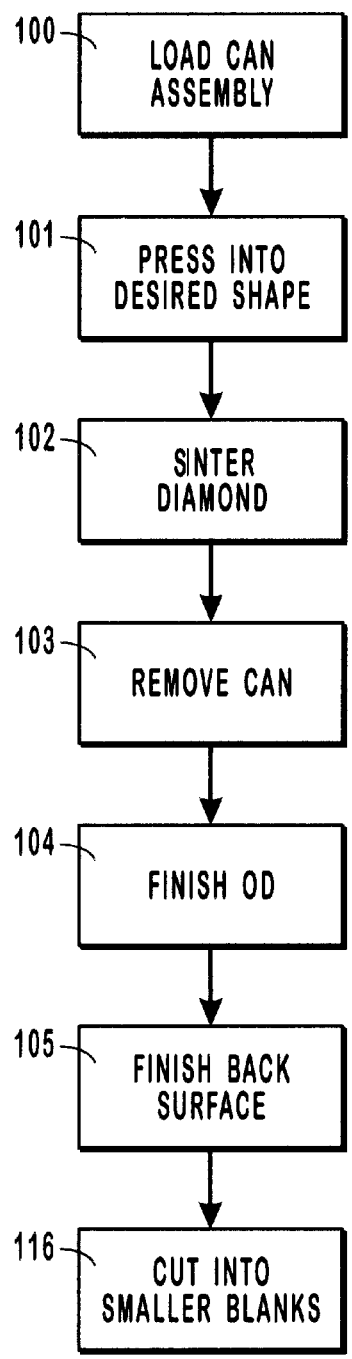
FIGS. 1a, 1b and 1c depict three preferred embodiments of processing steps of this invention.
Figure 1B:
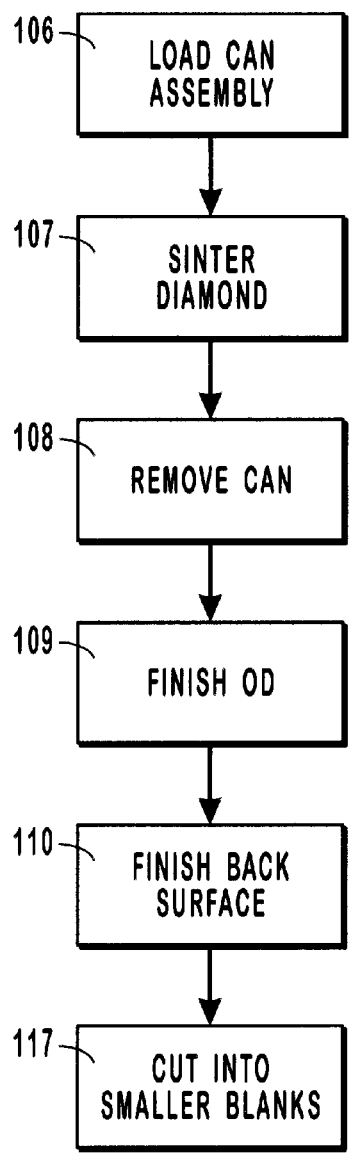
Figure 1C:
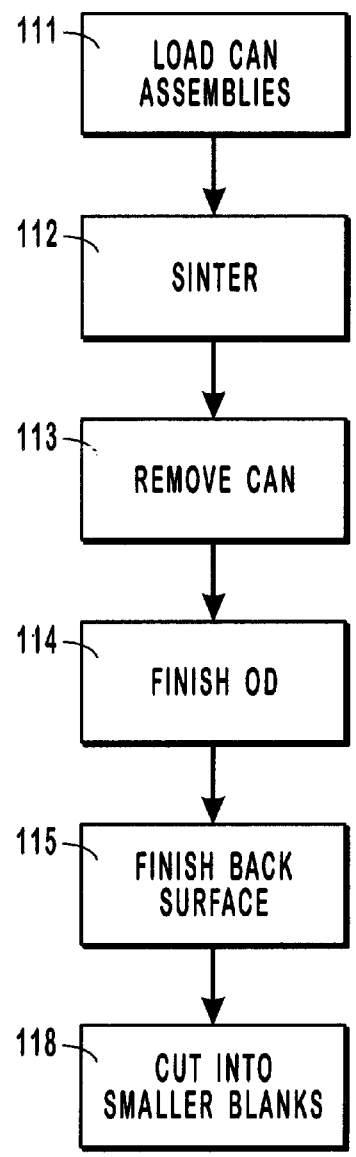

FIGS. 1a, 1b and 1c depict the preferred process steps of three preferred embodiments of this invention. The first preferred process shown in FIG. 1a with the cross section view of the processed Superabrasive shown in FIGS. 2a, 2b and 2c. This process begins 200 with the loading 100 of a can assembly, comprising a polycrystalline diamond layer 203 loaded on a carbide substrate region 204, the combination of which is loaded in a can assembly having a second can or bottom 206, a first can or inner cover 207 and a third can or top cover 205. Force is applied 201 to press 101 the desired shape into the surface of the polycrystalline diamond layer 203. This force compresses, creating deformations 208, 209 in both the top cover 205 and the inner cover 207 as well as the diamond cutter surface 203. After pressing 101 the desired shape into the cutter, the diamond is sintered 102 and becomes attached to the carbide region using sintering techniques will known in the art. The can 205, 206, 207 is then removed 103 and the outer diameter is finished 104. After which the back surface is finished 105. Thereby providing 202 the desired chip breaker Superabrasive, which in this case has an edge feature 210, 213 around the periphery of the Superabrasive and a cavity 211, 212 surrounding a central region 214. This surface geometry is shown only as an example. One of the key aspects of this invention is its ability to produce Superabrasives with a wide variety of alternative chip breaker geometries. Optionally, some Superabrasive blanks may be cut 116 into smaller final cutting tools using EDM or similar processes and finish ground as smaller tools.

FIG. 1b shows an alternative process for creating a Superabrasive with a chip breaker feature that makes use of a rigid or semi-rigid component inside the can to shape the diamond surface. This rigid or semi-rigid component can consist of a wide variety of materials, including but not limited to hexagonal boron nitride (hbn), niobium, metals, packed crystalline material, matrix composites, ceramics, tape case and the like. Also, this rigid or semi-rigid component can coated or have chemical variations to enhance sintering, facilitate its removal, or to improve the physical properties of the final product. Moreover, the surface texture of the rigid or semi-rigid component can be modified to be smooth, rough, dimpled, grooved, channeled, ridged or the like. FIGS. 3a and 3b show section views of Superabrasives being manufactured in this alternative process. A can assembly is loaded 106 having a second can or bottom 301, a first can or inner cover 302 and a third can or top cover 303, within which is held a diamond region 304 positioned atop a carbide substrate 305. A rigid component 306 is positioned on top of the surface of the diamond region 304. As the can is pressed the rigid component 306 imposes a surface geometry on the surface of the surface of the diamond region 304. Next, the diamond region 306 is sintered 107 and attaches to the carbide substrate 305 using sintering processes well known in the art. The can is removed 108 along with the rigid component 306. The outer diameter of the Superabrasive is finished 109, along with the back surface 110. Thereby, producing a Superabrasive having a carbide substrate 305 sintered to a polycrystalline diamond region 304, which has a desired chip breaker surface 307. Again, optionally, the tool can be EDM'ed 117 to smaller final tools as desired.

FIG. 1c shows a second alternative process for forming Superabrasives having an integral chip breaker feature. This alternative process provides for the simultaneous manufacture of two Superabrasives in the same press step by using a rigid component adapted for forming the chip breaker features on two Superabrasive simultaneously by being positioned between the cans of the two Superabrasives during the press step. Once again, this rigid or semi-rigid component can consist of a wide variety of materials, including but not limited to hexagonal boron nitride (hbn), niobium, metals, packed crystalline material, matrix composites, tape case and the like. Also, this rigid or semi-rigid component can coated or have chemical variations to enhance sintering, facilitate its removal, or to improve the physical properties of the final product. Moreover, the surface texture of the rigid or semi-rigid component can be modified to be smooth, rough, dimpled, grooved, channeled, ridged or the like. FIGS. 4a, 4b and 4c show section views of a pair of Superabrasives being manufactured by the process steps of this alternative embodiment of the process steps of this invention. First, both cans 400, 401 are loaded 111. Each can 400, 401 comprises a second can or bottom 402, 407; a first can or inner cover 403, 409 and a third can or outer cover 404, 408. Each can 400, 401 holds a diamond region 406, 411 and a carbide substrate 406, 411. A rigid component 412 is inserted between the outer covers 404, 408 of the two cans 400, 401. A mechanical press then compresses the two cans 400, 401 to the rigid component 412, deforming the outer covers 404, 408, inner covers 403, 409 and surfaces of the diamond regions 406, 411. Next, the diamond regions 406, 411 are sintered separately and attached 112 to their respective carbide substrates 405, 410 using well-known sintering methods. The cans 400, 401 are next removed 113. The outer diameters of each Superabrasive are finished 114 and the back surface of each Superabrasive is finished 115. In this manner two Superabrasives having chip breaker features 412, 413 can be manufactured using a single high temperature high-pressure cycle. As a final and optional step, the Superabrasive may be cut 118 into smaller blanks for individual use as chip breaking elements.

Figure 5A:
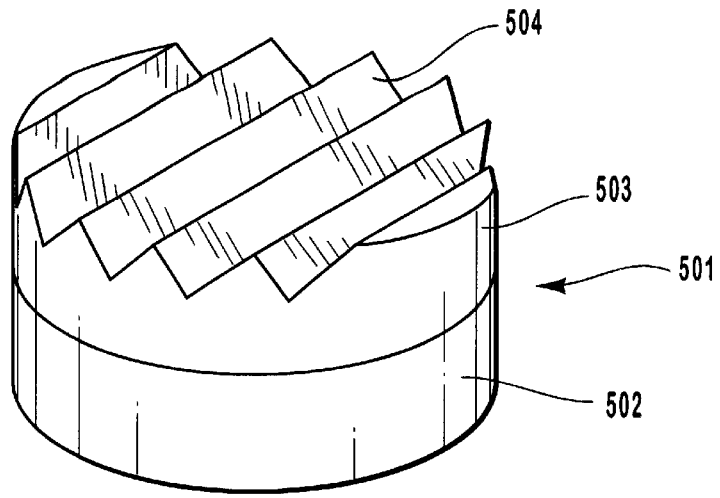
FIGS. 5a, 5b, and 5c depict alternative chip-breaker tool surface profiles of this invention.
Figure 5B:
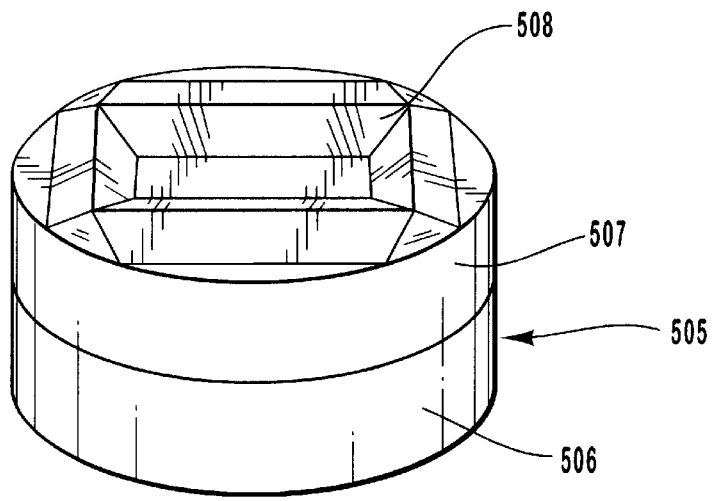
Figure 5C:
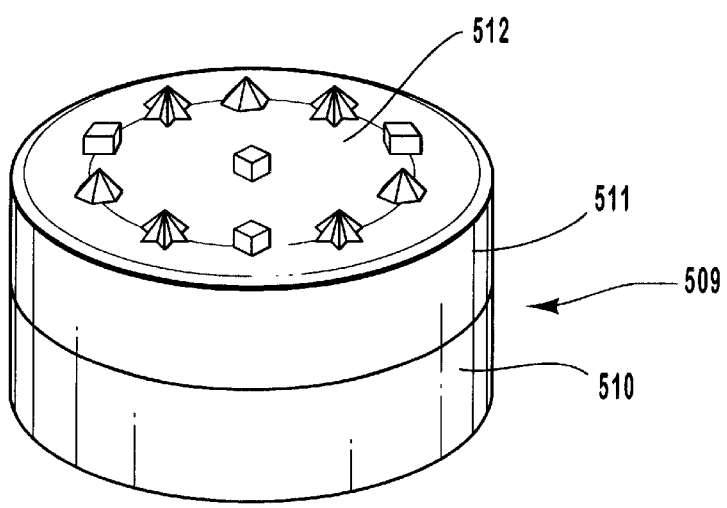

FIGS. 5a, 5b and 5c show three alternative chip breaker features 504, 508, 512 imposed on the surface of the diamond or CBN regions 503, 507, 511. As described previously, these embodiments also have the diamond regions 503, 507, 511 sintered to a carbide substrate 502, 506, 510. These embodiments 501, 505, 509 are provided to demonstrate a few of the countless specific chip breaker tool features that can be covered by the process of this invention. The method of this invention, by pressing the desired shape into the diamond, or alternatively cubic boron nitride (CBN), surface produces chip breaker tools with an unmachined, virgin diamond or CBN surface not having been EDM'ed, EDG'ed, ground, laser eroded, or other wise heat damaged and/or depleted of cobalt. Maintaining a uniform, or near uniform distribution of cobalt through the diamond layer and maintaining an uncut diamond surface provides chip breaker tools with improved durability and temperature tolerance.

The described embodiments are to be considered in all respects only as illustrative of the current best mode of the invention known to the inventor at the time of filing the patent application, and not as restrictive. For example, the processes of 1a and 1b may be performed with multiple parts in a single high pressure/high temperature cycle, or the process of 1c may be performed in a single high pressure/ high temperature cycle. Although the several embodiments shown here include a specific chip breaker surface geometry, this invention is not intended to be limited thereto. Rather this geometry is provided to show one example, this invention is specifically adapted to address the need for variety in Superabrasive cutting tool chip breaker geometries. The scope of this invention is, therefore, indicated by the appended claims rather than by the foregoing description. All devices and processes that come within the meaning and range of equivalency of the claims are to be embraced as within the scope of this patent.

We claim:

1. A method for making a superabrasive cutting tool having a chip breaker geometry, comprising:

(A) loading a can assembly with a carbide substrate having a top surface, a polycrystalline region, having a top surface, and a rigid component, and wherein said polycrystalline region is loaded on said top surface of said carbide substrate and wherein said rigid component is loaded on said top surface of said polycrystalline region;

(B) deforming said can assembly by pressing said can assembly and imposing a non-planar chip breaker feature on said polycrystalline region by pressing said rigid component into said top surface of said polycrystalline region;

(C) sintering said polycrystalline region to said carbide substrate to produce a superabrasive polycrystalline cutting tool;

(D) removing said can assembly from said rigid component from said superabrasive polycrystalline cutting tool; and (E) finishing said superabrasive polycrystalline cutting tool.

2. A method for making a superabrasive cutting tool having a chip breaker geometry, as recited in claim 1, wherein said loading of the can assembly further comprises:

(1) loading a polycrystalline region in a first can;

(2) loading a carbide substrate onto said polycrystalline region;

(3) placing a second can over said carbide substrate opposite said first can; and (4) placing a third can over said first can and opposite said second can.

3. A method for making a superabrasive cutting tool having a chip breaker geometry, as recited in claim 2, wherein said pressing step further comprises mechanically pressing said third can, said second can, said first can and said polycrystalline region prior to sintering.

4. A method for making a superabrasive cutting tool having a chip breaker geometry, as recited in claim 2, wherein said pressing step comprises mechanically pressing said third can, said second can, said first can and said polycrystalline region during sintering.

5. A method for making a superabrasive cutting tool having a chip breaker geometry, as recited in claim 2, wherein said step of loading of the can assembly further comprises loading a rigid component into said first can prior to loading said polycrystalline region into said first can, wherein said rigid component has a surface for imposing a chip breaker geometry.

6. A method for making a superabrasive cutting tool having a chip breaker geometry, as recited in claim 5, wherein said pressing step comprises pressing an outer cover thereby imposing a chip breaker geometry from said surface of said rigid component on said polycrystalline region.

7. A method for making a superabrasive cutting tool having a chip breaker geometry, as recited in claim 2, wherein said pressing step further comprises:

(1) inserting a rigid component between a first can assembly and a second can assembly, wherein said rigid component has a first surface for imposing a first chip breaker geometry on said first can assembly and said second surface for imposing a second surface on said second can assembly; and (2) pressing said first can assembly toward said second can assembly thereby imposing said first surface and said second surface on said first and second can assemblies.

8. A method for making a superabrasive cutting tool having a chip breaker geometry, as recited in claim 1, wherein said finishing said superabrasive polycrystalline cutting tool comprises:

(1) finishing an outer diameter of said superabrasive polycrystalline cutting tool; and (2) finishing a back surface of said superabrasive polycrystalline cutting tool.

* * * * *